United States Patent
Chandra et al.

(10) Patent No.: US 10,230,498 B2
(45) Date of Patent: Mar. 12, 2019

(54) DATA ACKNOWLEDGMENT TO MULTIPLE DEVICES

(71) Applicant: Microsoft Technology Licensing, LLC, Redmond, WA (US)

(72) Inventors: Ranveer Chandra, Kirkland, WA (US); David W. Russo, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 14/940,872

(22) Filed: Nov. 13, 2015

(65) Prior Publication Data

US 2017/0141882 A1    May 18, 2017

(51) Int. Cl.
*H04L 1/16* (2006.01)
*H04L 12/707* (2013.01)
(Continued)

(52) U.S. Cl.
CPC .......... *H04L 1/1678* (2013.01); *H04L 1/1887* (2013.01); *H04L 45/22* (2013.01); *H04L 47/826* (2013.01)

(58) Field of Classification Search
None
See application file for complete search history.

(56) References Cited

U.S. PATENT DOCUMENTS 7,274,690 B1 * 9/2007 Park .................... H04L 49/101
                                                370/388
7,433,363 B2 * 10/2008 Rosen ................. H04L 49/3018
                                                370/413

(Continued)

FOREIGN PATENT DOCUMENTS

| CN | 1894914 B | 1/2007 |
| EP | 154504 A1 | 6/2005 |
| WO | 2014190100 A1 | 11/2014 |

OTHER PUBLICATIONS

International Search Report and the Written Opinion of the International Searching Authority, Issued for PCT Application No. PCT/US2016/060748, dated Jan. 25, 2017, 12 pages.
Majkowski, et al., "Enhanced TXOP Scheme for Effficiency Improvement of WLAN IEEE 802.11e", In Proceedings of IEEE 64th Vehicular Technology Conference, Sep. 25, 2006, 5 pages.
Reddy, et al., "Providing MAC QoS for Multimedia Traffic in 802.11e Based Multi-Hop Ad Hoc Wireless Networks", In Journal of Computer Networks, vol. 51, Issue 1, Jan. 17, 2007, pp. 153-176.
(Continued)

*Primary Examiner* — Ayaz R Sheikh
*Assistant Examiner* — Faiyazkhan Ghafoerkhan
(74) *Attorney, Agent, or Firm* — International IP Law Group, PLLC

(57) ABSTRACT

Various systems and methods for transmitting data are described herein. In one example, a method includes detecting a plurality of data frames to be transmitted using a shared communication network and selecting a first and a second data frame from the plurality of data frames based on a deadline for each of the plurality of data frames. The method also includes transmitting, via a shared communication network, the first data frame to a first client device and waiting for a predetermined delay period. Additionally, the method includes detecting a data acknowledgement frame from the first client device and transmitting, via the shared communication network, the second data frame to a second client device, the first data frame and the second data frame to be transmitted sequentially. Furthermore, the method includes transferring control of the shared communication network to an external device.

22 Claims, 5 Drawing Sheets

(51) Int. Cl.
*H04L 12/911* (2013.01)
*H04L 1/18* (2006.01)

(56) References Cited

U.S. PATENT DOCUMENTS

| | | | | |
|---|---|---|---|---|
| 7,461,167 B1* | 12/2008 | Park | ............... | H04L 47/10 709/225 |
| 7,463,892 B2 | 12/2008 | Eiger et al. | | |
| 7,505,422 B1* | 3/2009 | Park | ............... | H04L 45/7453 370/256 |
| 7,644,200 B2* | 1/2010 | Sharma | ............... | H04L 1/1685 370/235 |
| 7,788,424 B2* | 8/2010 | Sharma | ............... | H04L 1/1685 370/235 |
| 8,014,818 B2 | 9/2011 | Grandhi et al. | | |
| 8,625,570 B2 | 1/2014 | Chu et al. | | |
| 8,705,340 B2 | 4/2014 | Gong et al. | | |
| 8,724,469 B2 | 5/2014 | Verma et al. | | |
| 8,730,960 B2 | 5/2014 | Hart et al. | | |
| 8,842,657 B2 | 9/2014 | Walton et al. | | |
| 9,001,796 B2* | 4/2015 | Frederiks | ............... | H04W 72/10 370/336 |
| 9,492,741 B2* | 11/2016 | Russo | ............... | H04W 72/02 |
| 2002/0036984 A1* | 3/2002 | Chiussi | ............... | H04L 12/5602 370/232 |
| 2005/0135284 A1* | 6/2005 | Nanda | ............... | H04L 29/06068 370/294 |
| 2006/0039370 A1* | 2/2006 | Rosen | ............... | H04L 49/3018 370/389 |
| 2006/0120339 A1* | 6/2006 | Akiyama | ............... | H04L 1/1678 370/338 |
| 2008/0069040 A1* | 3/2008 | An | ............... | H04W 74/008 370/329 |
| 2008/0095091 A1* | 4/2008 | Surineni | ............... | H04W 52/0225 370/311 |
| 2008/0112424 A1 | 5/2008 | Kim et al. | | |
| 2008/0119130 A1* | 5/2008 | Sinha | ............... | H04W 12/06 455/1 |
| 2008/0133790 A1* | 6/2008 | Sharma | ............... | H04L 1/1685 710/30 |
| 2008/0186913 A1* | 8/2008 | Ahn | ............... | H04L 12/185 370/329 |
| 2008/0186945 A1* | 8/2008 | Ahn | ............... | H04L 1/16 370/349 |
| 2008/0188222 A1* | 8/2008 | Oh | ............... | H04W 74/002 455/436 |
| 2010/0049884 A1* | 2/2010 | Sharma | ............... | H04L 1/1685 710/30 |
| 2013/0077554 A1* | 3/2013 | Gauvreau | ............... | H04L 5/001 370/312 |
| 2014/0010144 A1* | 1/2014 | Liu | ............... | H04W 74/0816 370/312 |
| 2014/0126550 A1* | 5/2014 | Frederiks | ............... | H04W 74/085 370/336 |
| 2014/0349745 A1* | 11/2014 | Russo | ............... | H04W 72/02 463/29 |
| 2015/0043409 A1* | 2/2015 | Choi | ............... | H04W 52/0216 370/311 |
| 2015/0055546 A1 | 2/2015 | Jafarian et al. | | |
| 2015/0092658 A1* | 4/2015 | Trainin | ............... | H04W 24/10 370/312 |
| 2016/0050659 A1* | 2/2016 | Seok | ............... | H04L 1/0003 370/338 |
| 2016/0135083 A1* | 5/2016 | Lee | ............... | H04W 28/22 370/230 |
| 2016/0301563 A1* | 10/2016 | Erdmann | ............... | H04L 1/1835 |
| 2016/0345362 A1* | 11/2016 | Lee | ............... | H04W 74/0816 |
| 2017/0164406 A1* | 6/2017 | Son | ............... | H04W 74/08 |
| 2017/0208605 A1* | 7/2017 | Ansari | ............... | H04W 74/0816 |

OTHER PUBLICATIONS

Dely, et al., "An Experimental Comparison of Burst Packet Transmission Schemes in IEEE 802.11-based Wireless Mesh Networks", In Proceedings of IEEE Global Telecommunications Conference, Dec. 6, 2012, 5 pages.

Ahn, et al., "A Fair Transmission Opportunity by Detecting and Punishing the Malicious Wireless Stations in IEEE 802.11e EDCA Network", In IEEE Systems Journal, vol. 5, Issue 4, Dec. 4, 2011, pp. 486-494.

Majkowski, et al., "Dynamic TXOP configuration for Qos enhancement in IEEE 802.11e wireless LAN", In Proceedings of International Conference on Software in Telecommunications and Computer Networks, Sep. 29, 2006, 5 pages.

Leith, et al., "Max-min Fairness in 802.11 Mesh Networks", In Proceedings of IEEE/ACM Transactions on Networking, vol. 20, Issue 3, Mar. 3, 2010, 14 pages.

International Preliminary Report on Patentability issued for PCT Application No. PCT/US2016/060748 dated Oct. 24, 2017, 12 pages.

* cited by examiner

300

DATA ACKNOWLEDGMENT TO MULTIPLE DEVICES

BACKGROUND

Electronic devices can transmit data using a variety of communication interfaces and protocols. For example, electronic devices can transmit data using a connection to a physical wire or via wireless communication protocols. In some examples, the wireless communication protocols can include the media access specification, among others. The communication protocols can enable multiple devices to transmit data within a shared communication network.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a system for transmitting data comprising a processor and a computer-readable memory storage device storing executable instructions that, based at least on execution by the processor, cause the processor to detect a plurality of data frames to be transmitted using a shared communication network. The executable instructions can also cause the processor to select a first data frame and a second data frame from the plurality of data frames based on a deadline for each of the plurality of data frames and transmit the first data frame to a first client device using the shared communication network. Additionally, the executable instructions can cause the processor to wait for a predetermined delay period and detect a data acknowledgement frame from the first client device and transmit the second data frame to a second client device using the shared communication network, the first data frame and the second data frame to be transmitted sequentially.

Another embodiment provides a method for transmitting data that includes detecting a plurality of data frames to be transmitted using a shared communication network and selecting a first data frame and a second data frame from the plurality of data frames based on a deadline for each of the plurality of data frames. The method can also include transmitting, via the shared communication network, the first data frame to a first client device and waiting for a predetermined delay period. Furthermore, the method can include detecting a data acknowledgement frame from the first client device and transmitting, via the shared communication network, the second data frame to a second client device, the first data frame and the second data frame to be transmitted sequentially. In addition, the method can include transferring control of the shared communication network to an external device by stopping transmission of data frames for a period of time equal to a distributed coordination function inter frame space delay.

Another embodiment provides one or more computer-readable storage devices for transmitting data comprising a plurality of instructions that, based at least on execution by a processor, cause the processor to detect a plurality of data frames to be transmitted using a shared communication network. The plurality of instructions can also cause the processor to select a first data frame and a second data frame from the plurality of data frames based on a deadline for each of the plurality of data frames and transmit, via a shared communication network, the first data frame to a first client device. The plurality of instructions can also cause the processor to wait for a predetermined delay period, detect a data acknowledgement frame from the first client device, and transmit, via the shared communication network, the second data frame to a second client device, the first data frame and the second data frame to be transmitted sequentially by the communication interface. Furthermore, the plurality of instructions can also cause the processor to transfer control of the shared communication network to an external device by stopping transmission of data frames for a period of time equal to a distributed coordination function inter frame space delay.

Yet another embodiment provides a system for transmitting data comprising a processor and a computer-readable memory storage device storing executable instructions that, based at least on execution by the processor, cause the processor to receive a data transmission via a shared communication network and acknowledge the receipt of the data transmission by transmitting data frames to a plurality of devices based on a deadline for the plurality of data frames.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
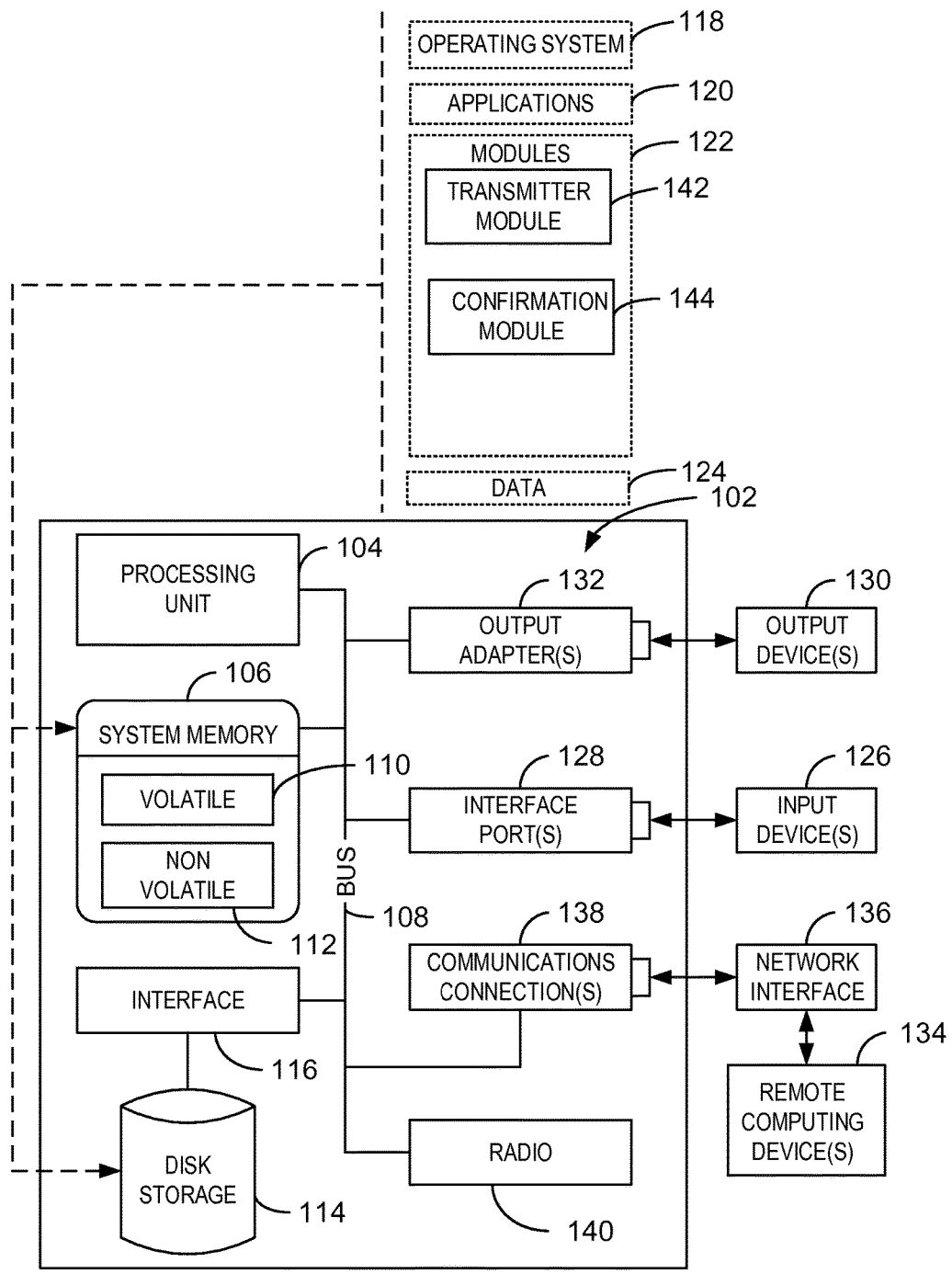
FIG. 1 is a block diagram of an example of a computing system that can transmit data via a wireless communication.

Contention can result as multiple devices attempt to access a communication medium to transmit data over a network in a first come-first served manner or using any other suitable technique. The contention can occur as two or more devices attempt to access the network, or contend for transmitting data, at the same time. Moreover, in a centralized network, an access point or host device may have many more data frames to send than the client devices of the network. In some cases, contention can also cause increased latency of packets, delayed packets, and packet collisions, which result in poor performance. For example, performance can be particularly affected in real-time and gaming scenarios.

In some examples, if multiple access points transmit data via the same communication channel, medium contention overhead occurs. For example, various local area wireless networks may use a listen-before-you-talk technology called clear channel assessment (CCA) to ensure that one radio can transmit on the same channel at any given time. If an access point is transmitting data on one channel, nearby access points and clients on the same channel will defer data transmissions. This can result in reducing throughput by causing nearby access points and clients to wait longer to transmit data. The unnecessary medium contention overhead that occurs when multiple access points transmit data via one channel is called co-channel interference (CCI).

The techniques described herein can enable data transmission between two electronic devices while reducing contention and improving system latency. In some embodiments, a device can transmit a first data frame to a first client device using a shared communication network and a second data frame to a second client device using the shared communication network, wherein the first data frame and the second data frame are transmitted sequentially by a communication interface. A data frame, as referred to herein, can include any suitable amount of data to be transmitted using any suitable protocol or interface. In some examples, the amount of data to be included in each data frame can be specified by a protocol such as the media access control specification. In some embodiments, the media access control specification can also indicate addressing and channel access control mechanisms to enable data transmissions between any number of client devices and host devices on a shared communication network. A shared communication network, as referred to herein, can include any number of client devices that communicate with one or more host devices using any suitable communication protocol.

In some embodiments, transmission of the first data frame and the second data frame occurs before an external device can transmit data using the same wireless channel. In some examples, a device can transfer control of a communication medium to an external device by stopping transmission of data frames for a period of time equal to a distributed coordination function inter frame space delay. This delay indicates to external devices that the communication medium is available. In some embodiments, a system can modify a transmission operation time to enable multiple data frames to be transmitted to multiple clients sequentially prior to providing transmission control to another device.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can transmit data via a wireless communication. The example system 100 includes a computing device 102.

The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/nonvolatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 142 take advantage of the management of resources by operating system 118 through program modules 144 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

An example processing unit 104 for the server may be a computing cluster. Additionally, the disk storage 114 can store various types of data 124 used for wireless communication. For example, the disk storage 114 may be an enterprise data storage system. In some examples, the disk storage 114 may store data 124 such as data to be transmitted in network packets or data frames.

The computer 102 includes one or more modules 144, such as a transmitter module 142 and a confirmation module 144, configured to enable transmitting data via a wireless communication. The transmitter module 142 and confirmation module 144 refer to structural elements that perform associated functions. In some embodiments, the functionalities of the transmitter module 142 and confirmation module 144 can be implemented with logic, wherein the logic, as referred to herein, can include any suitable hardware (e.g., a processor, among others), software (e.g., an application, among others), firmware, or any combination of hardware, software, and firmware. In some embodiments, the transmitter module 142 can detect a plurality of data frames to be transmitted using a shared communication network and select a first and a second data frame from the plurality of data frames based on a deadline for each of the plurality of data frames. The transmitter module 142 can also transmit the first data frame to a first client device using a shared communication network and wait for a period of time equal to a predetermined delay period, such as a short inter frame space, among others. The predetermined delay period can represent an amount of time to transmit and receive data between the first client device and a host device. The confirmation module 144 can detect an acknowledgement indicator or data acknowledgment frame from the client device. The acknowledgment indicator can confirm to a host device that a client device has received the first data frame. A data acknowledgment frame can confirm that a client device has received a first data frame by responding to a host device with a separate data frame. The transmitter module 142 can also transmit the second data frame to a second client device using the shared communication network, wherein the first data frame and the second data frame are transmitted sequentially by a communication interface. The communication interface, as referred to herein, can include any component that can transmit data to an external device. In some examples, the communication interface can include a communication connection 138. The transmitter module 142 enables a host device to avoid contention by sending a first data frame to a first client device and a second data frame to a second client device without relinquishing control of a communication medium. In some embodiments, the transmitter module 142 can transmit any suitable number of data frames to any number of client devices before relinquishing or transferring control of a communication media. The transfer of control of a communication media is described in greater detail below in relation to FIG. 4.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). For example, a frame aggregator module can be included in the computing system 102 to identify the first data frame or the second data frame based in part on a deadline. In some embodiments, the frame aggregator can identify an order in which to transmit the first data frame and the second data frame based on a deadline. Furthermore, any of the functionalities of the transmitter module 142 and confirmation module 144 may be partially, or entirely, implemented in hardware and/or in the processor 102. For example, the functionality may be implemented with an application specific integrated circuit, in logic implemented in the processor 102, or in any other device.

Figure 2:
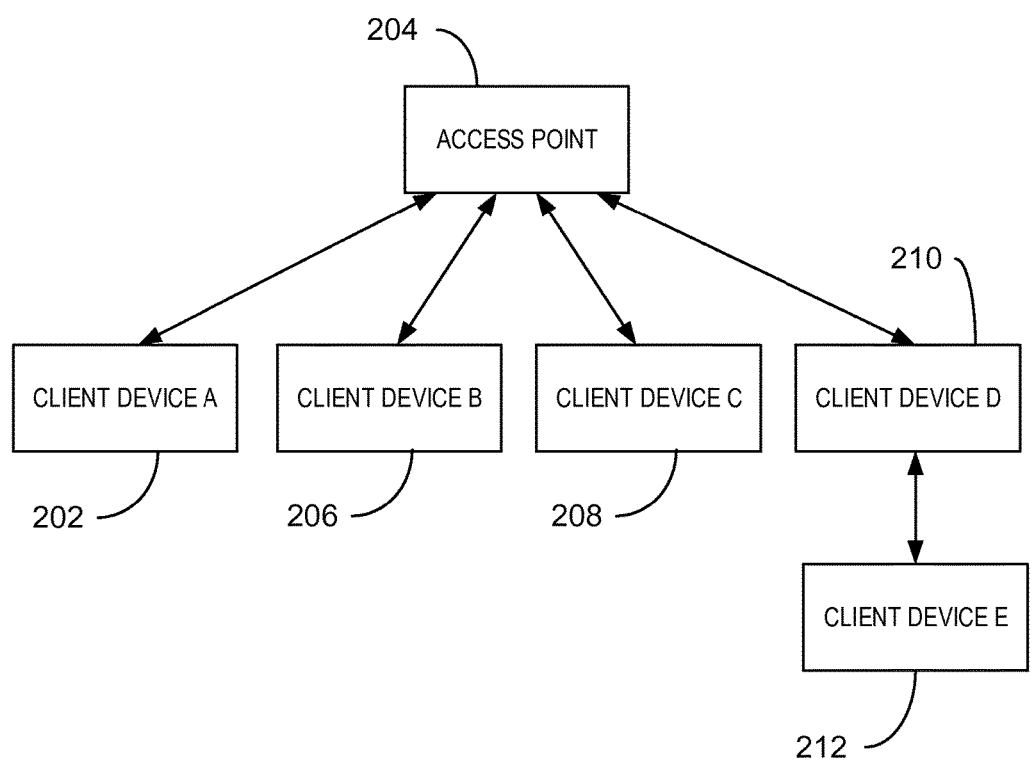
FIG. 2 is a block diagram illustrating an environment for transmitting data via a wireless communication.

FIG. 2 is a block diagram illustrating transmitting data via a wireless communication. In one example, client device A 202 can transmit a data frame to an access point 204. The access point 204 can then transmit consecutive data frames to client device A 202 and client device B 206 without contention or transferring control of a communication medium to client device A 202 or client device B 206. A communication medium can include any suitable wireless channel or other means for transmitting data. In some embodiments, the access point 204 can transmit data frames to any number of additional devices such as client device C 208 and client device D 210 without relinquishing control of a communication medium. In one example, a device, such as client device D 210, can transmit data using a direct connection, such as a direct local area network connection, with the access point 204 and another client device E 212 without requiring contention.

Figure 3:
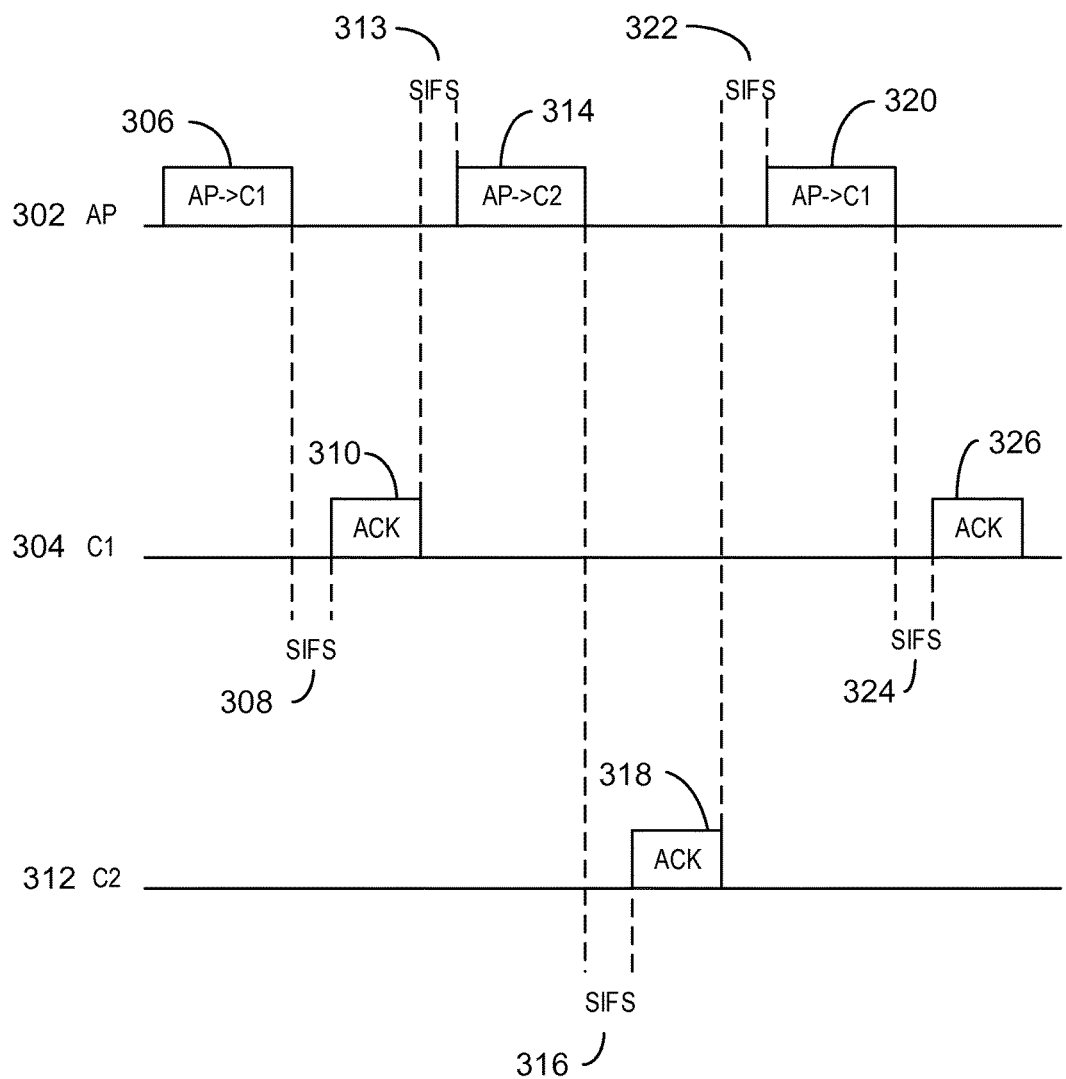
FIG. 3 is a timing diagram for transmitting data via a wireless communication using an embodiment described herein.

FIG. 3 is a timing diagram for transmitting data using an embodiment described herein. The access point 302 can transmit a data frame to a client device c1 304 at block 306. The access point 302 can then wait at block 308 for a period of time equal to a short inter frame space for a particular protocol. The access point 302 can then detect an acknowledgment frame at block 310 transmitted from the client device c1 304 to the access point 302. The access point 302 can then wait for a period of time, such as a SIFS delay, at block 313 and transmit a data frame to a client device c2 312 at block 314 without transferring control of a communication medium to another device. The access point 302 can wait for a period of time at block 316 equal to a short inter frame space for a particular protocol. The access point 302 can then detect an acknowledgment frame at block 318 transmitted from the client device c2 312 to the access point 302. In some examples, the access point 302 can then detect additional data frames from the client devices. For example, the access point 302 can detect a data frame from client device c1 304 at block 320 following a short inter frame space at block 322. The access point 302 can then wait for a short inter frame space at block 324 before detecting an acknowledgment frame at block 326 from the client device c1 304. In some embodiments, the access point 302 can transfer control of a communication medium to client device c1 304 or client device c2 312 by waiting to transmit any data frames for a period of time equal to a distributed coordination function inter frame space delay. In some embodiments, any number of the acknowledgment frames can be data acknowledgment frames, which are discussed in greater detail below in relation to block 410 of FIG. 4.

In some embodiments, any client device such as client device c1 304 or client device c2 312 can receive a data transmission via a shared communication network. The client devices can also acknowledge the receipt of the data transmission by transmitting data frames to a plurality of devices based on a deadline for the plurality of data frames.

Figure 4:
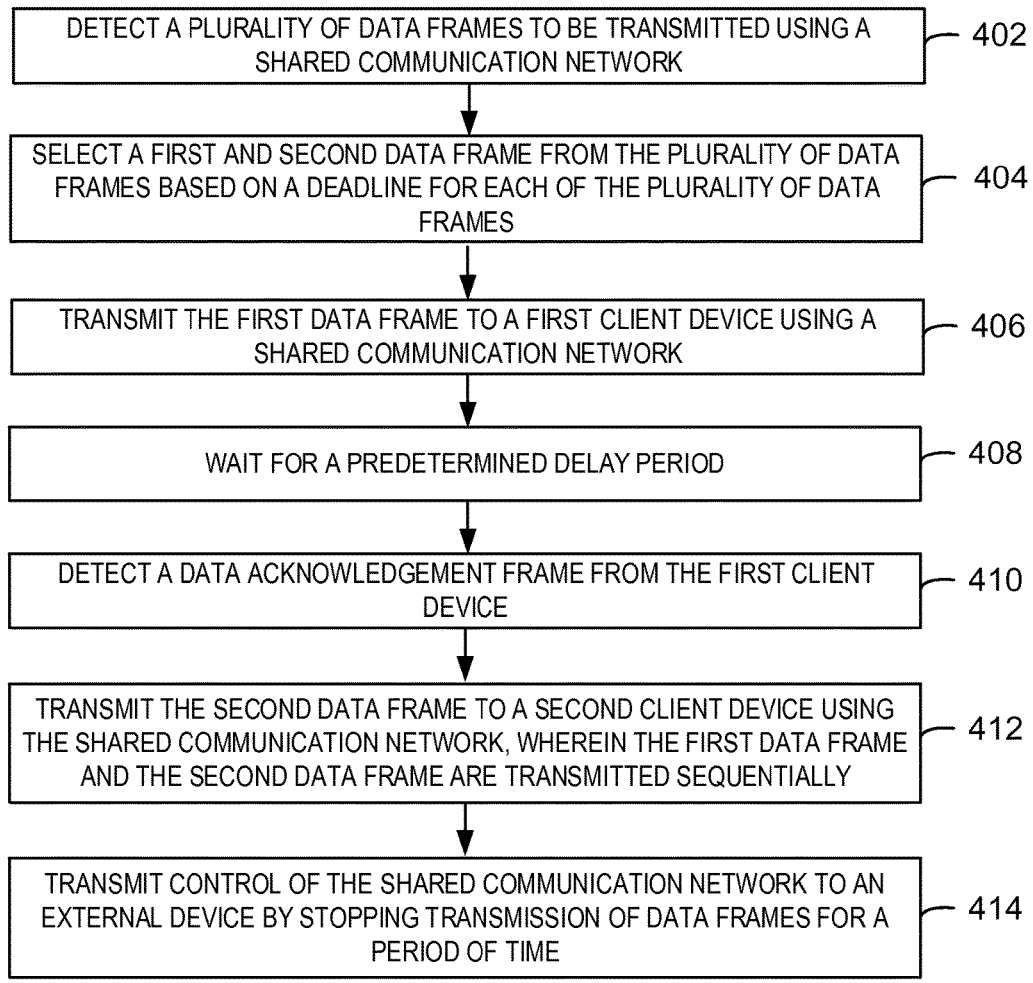
FIG. 4 is a process flow diagram of an example method for transmitting data via a wireless communication.

FIG. 4 is a process flow diagram of an example method for transmitting data. The method 400 can be implemented with any suitable computing device, such as the computing system 102 of FIG. 1.

At block 402, the transmitter module 142 can detect a plurality of data frames to be transmitted using a shared communication network. As discussed above, the data frames can include any suitable amount of data to be transmitted using any suitable protocol or interface. In some embodiments, the data can be transmitted using a protocol that involves a wireless communication or a communication that is transmitted by a wire such as a telephone network, cable network, fiber-optic network, and the like. A shared communication network, as discussed above, can include any number of client devices that transmit data with one or more host devices via any suitable protocol.

At block 404, the transmitter module 142 can select a first and a second data frame from the plurality of data frames based on a deadline for each of the plurality of data frames. A deadline, as referred to herein, can include a time by which a data frame is to be received by a host device. The deadline can correspond to a maximum latency tolerated by a protocol. For example, a deadline for a data frame can indicate that the data frame is to be transmitted to a host device within a predetermined period of time. In some embodiments, the deadline can be calculated based on a type of content associated with the data frame. For example, data frames associated with audio or video content may have shorter deadlines, while data frames associated with other content, such as file transfers and email messages, may have longer deadlines. In some examples, the first data frame and the second data frame can correspond to data frames with the shortest deadlines in a queue of data frames to be transmitted from a client device to a host device. In some embodiments, the first data frame or the second date frame can include data from an aggregate frame, wherein the aggregate frame includes individual data frames for a first client device or a second client device and a block acknowledgment. The block acknowledgment can include an acknowledgment that corresponds to multiple data frames.

At block 406, the transmitter module 142 can transmit the first data frame to a first client device using a shared communication network. In some embodiments, the transmitter module 142 can transmit the first data frame via the shared communication network using any suitable protocol such as the media access control specification. For example, the transmitter module 142 can use techniques such as carrier sense multiple access with collision detection (also referred to herein as CSMA/CD) to transmit the first data frame. In some embodiments, the CSMA/CD technique can be used to avoid collisions of data when transmitting information in a local area network. The CSMA/CD technique can include monitoring a communication medium to determine if there is data being transmitted. The CSMA/CD technique can include waiting for the communication medium to become idle for a predetermined period of time before transferring control to a device to transmit data. In some embodiments, the first data frame can be broadcast or multicast. The first data frame can also be a beacon frame or a control frame. In some examples, the beacon frame or control frame comprises data to synchronize nodes in a network. For example, the beacon frame can provide a timestamp used to synchronize local clocks that reside in each node in a network. In some embodiments, the beacon frame can also indicate the closest access point with the strongest signal in relation to nodes in a network.

At block 408, the transmitter module 142 can wait for a predetermined delay period. In some embodiments, the predetermined delay period can be equal to a short inter frame space, a PCF inter frame space, (PIFS), or an extended inter frame space, among others. In some embodiments, the predetermined delay period can be an amount of time for a wireless interface to process a received frame and respond with a response frame. In some examples, the predetermined delay period can include a receiver delay, a physical layer convergence procedure delay and a MAC processing delay. The predetermined delay period can vary depending on the protocol used to transmit data. In some examples, the predetermined delay period can correspond to a time period in the media access control specification.

At block 410, the confirmation module 144 can detect a data acknowledgement frame from the first client device. A data acknowledgment frame can transmit data while indicating a confirmation of receipt of data or information transmitted via any suitable communication medium or network, such as a local area network, among others. For example, the data acknowledgment frame can include any amount of data that can be returned as an acknowledgment that a previous data frame was received by the first client device.

At block 412, the transmitter module 142 can transmit a second data frame to a second client device using the shared communication network, wherein the first data frame and the second data frame are transmitted sequentially. For example, the transmitter module 142 can transmit a second data frame to a second client device following an acknowledgment indicator and prior to waiting for a period of time, such as a distributed coordination function inter frame space (DIFS) delay, which can transfer control of the wireless medium to another device. The transmitter module 142 can thereby enable a device to transmit multiple data frames to multiple computing devices prior to relinquishing control of a communication medium.

At block 414, a transfer module can transfer control of a communication medium or shared communication network to an external device by stopping transmission of data frames for a period of time equal to a distributed coordination function inter frame space (DIFS) delay. For example, the transfer module can stop data transmission for a period of time equal to a DIFS, which can enable another device to begin transmitting data via the communication medium. In some examples, stopping data transmission for a period of time equal to a DIFS is the first action to begin transfer of control of a communication medium to another device.

In one embodiment, the process flow diagram of FIG. 4 is intended to indicate that the steps of the method 400 are to be executed in a particular order. Alternatively, in other embodiments, the steps of the method 400 can be executed in any suitable order and any suitable number of the steps of the method 400 can be included. Further, any number of additional steps may be included within the method 400, depending on the specific application. In some embodiments, the transmitter module 142 can identify the first data frame or the second data frame based in part on a deadline. For example, the first data frame or the second data frame can be detected from a set of data frames based on an expiration time or deadline. In some examples, the data frames are to be transmitted prior to a deadline, so the transmitter module 142 can identify the data frames to be transmitted prior to a deadline being reached. In some embodiments, the transmitted 142 can also identify an order in which to transmit the first data frame and the second data frame based on the deadline. Furthermore, in some embodiments, the second data frame sent to the second client device can be a retransmission of the first data frame sent to the first client device. The transmitter module 142 can store the first data frame in firmware and retransmit the first data frame as a second date frame to a second client device without regenerating the second data frame in software. In some embodiments, the first date frame can be retransmitted to any suitable number of client devices.

Figure 5:
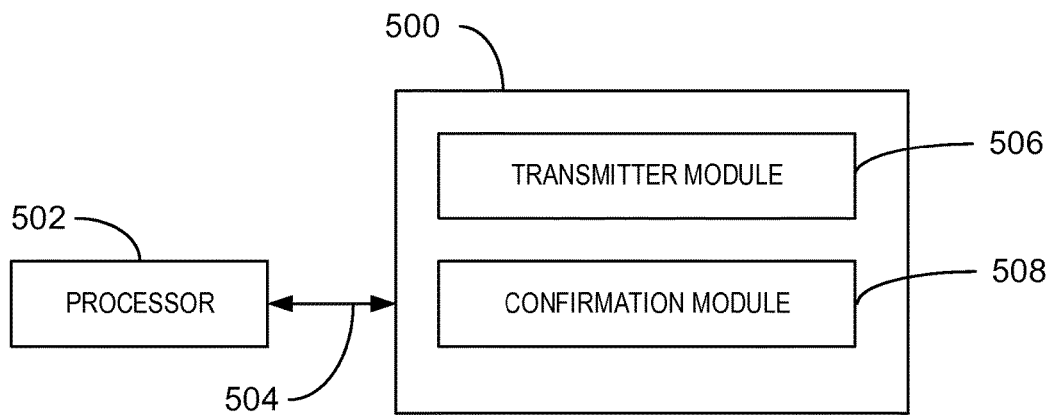
FIG. 5 is a block diagram of an example computer-readable storage media that can transmit data via a wireless communication.

FIG. 5 is a block diagram of an example computer-readable storage media that can transmit data using a wireless communication. The tangible, computer-readable storage media 500 may be accessed by a processor 502 over a computer bus 504. Furthermore, the tangible, computer-readable storage media 500 may include code to direct the processor 502 to perform the steps of the current method.

The various software components discussed herein may be stored on the tangible, computer-readable storage media 500, as indicated in FIG. 5. For example, the tangible computer-readable storage media 500 can include a transmitter module 506 and a confirmation module 508. The transmitter module 506 and confirmation module 508 refer to structural elements that perform associated functions. In some embodiments, the functionalities of the transmitter module 506 and confirmation module 508 can be implemented with logic, wherein the logic, as referred to herein, can include any suitable hardware (e.g., a processor, among others), software (e.g., an application, among others), firmware, or any combination of hardware, software, and firmware. The transmitter module 506 can detect a plurality of data frames to be transmitted using a shared communication network and select a first data frame and a second data frame from the plurality of data frames based on a deadline for each of the plurality of data frames. The transmitter module 506 can also transmit the first data frame to a first client device using a shared communication network and wait for a predetermined delay period. The confirmation module 508 can detect a data acknowledgement frame from the first client device. The transmitter module 506 can also transmit the second data frame to a second client device using the shared communication network, wherein the first data frame and the second data frame are transmitted sequentially by a communication interface. It is to be understood that any number of additional software components not shown in FIG. 5 may be included within the tangible, computer-readable storage media 500, depending on the specific application.

EXAMPLE 1

An embodiment provides a system for transmitting data comprising a processor and a computer-readable memory storage device storing executable instructions that, based at least on execution by the processor, cause the processor to detect a plurality of data frames to be transmitted using a shared communication network. The executable instructions can also cause the processor to select a first data frame and a second data frame from the plurality of data frames based on a deadline for each of the plurality of data frames and transmit the first data frame to a first client device using the shared communication network. Additionally, the executable instructions can cause the processor to wait for a predetermined delay period and detect a data acknowledgement frame from the first client device and transmit the second data frame to a second client device using the shared communication network, the first data frame and the second data frame to be transmitted sequentially.

Alternatively, or in addition, the deadline can include a time by which the first data frame or the second data frame is to be transmitted. Alternatively, or in addition, the processor can identify an order in which to transmit the first data frame and the second data frame based on the deadline. Alternatively, or in addition, the first data frame or the second data frame can be broadcast or multicast. Alternatively, or in addition, the second data frame can be a retransmission of the first data frame and the second data frame can be transmitted to additional client devices. Alternatively, or in addition, the control frame can include data to synchronize nodes in a network. Alternatively, or in addition, the short inter frame space can correspond to a time period in the media access control specification.

EXAMPLE 2

Another embodiment provides a method for transmitting data that includes detecting a plurality of data frames to be transmitted using a shared communication network and selecting a first data frame and a second data frame from the plurality of data frames based on a deadline for each of the plurality of data frames. The method can also include transmitting, via the shared communication network, the first data frame to a first client device and waiting for a predetermined delay period. Furthermore, the method can include detecting a data acknowledgement frame from the first client device and transmitting, via the shared communication network, the second data frame to a second client device, the first data frame and the second data frame to be transmitted sequentially. In addition, the method can include transferring control of the shared communication network to an external device by stopping transmission of data frames for a period of time equal to a distributed coordination function inter frame space delay.

Alternatively, or in addition, the deadline can include a time by which the first data frame or the second data frame is to be transmitted. Alternatively, or in addition, the processor can identify an order in which to transmit the first data frame and the second data frame based on the deadline. Alternatively, or in addition, the first data frame or the second data frame can be broadcast or multicast. Alternatively, or in addition, the second data frame can be a retransmission of the first data frame and the second data frame can be transmitted to additional client devices. Alternatively, or in addition, the control frame can include data to synchronize nodes in a network. Alternatively, or in addition, the short inter frame space can correspond to a time period in the media access control specification.

EXAMPLE 3

Another embodiment provides one or more computer-readable storage devices for transmitting data comprising a plurality of instructions that, based at least on execution by a processor, cause the processor to detect a plurality of data frames to be transmitted using a shared communication network. The plurality of instructions can also cause the processor to select a first data frame and a second data frame from the plurality of data frames based on a deadline for each of the plurality of data frames and transmit, via a shared communication network, the first data frame to a first client device. The plurality of instructions can also cause the processor to wait for a predetermined delay period, detect a data acknowledgement frame from the first client device, and transmit, via the shared communication network, the second data frame to a second client device, the first data frame and the second data frame to be transmitted sequentially by the communication interface. Furthermore, the plurality of instructions can also cause the processor to transfer control of the shared communication network to an external device by stopping transmission of data frames for a period of time equal to a distributed coordination function inter frame space delay.

Alternatively, or in addition, the deadline can include a time by which the first data frame or the second data frame is to be transmitted. Alternatively, or in addition, the processor can identify an order in which to transmit the first data frame and the second data frame based on the deadline. Alternatively, or in addition, the first data frame or the second data frame can be broadcast or multicast. Alternatively, or in addition, the second data frame can be a retransmission of the first data frame and the second data frame can be transmitted to additional client devices. Alternatively, or in addition, the control frame can include data to synchronize nodes in a network. Alternatively, or in addition, the short inter frame space can correspond to a time period in the media access control specification. Alternatively, or in addition, the first data frame or the second date frame can include data from an aggregate frame, the aggregate frame comprising individual frames for the first client device or the second client device and a block acknowledgment.

EXAMPLE 4

Yet another embodiment provides a system for transmitting data comprising a processor and a computer-readable memory storage device storing executable instructions that, based at least on execution by the processor, cause the processor to receive a data transmission via a shared communication network and acknowledge the receipt of the data transmission by transmitting data frames to a plurality of devices based on a deadline for the plurality of data frames.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for transmitting data, comprising:
 a processor; and
 a computer-readable memory storage device storing executable instructions that, based at least on execution by the processor, cause the processor to:
 detect a plurality of data frames to be transmitted using a shared communication network;
 select a first data frame and a second data frame from the plurality of data frames based on a deadline for each of the plurality of data frames;
 transmit the first data frame to a first client device using the shared communication network;
 wait for a predetermined delay period, the predetermined delay period corresponding to a physical layer convergence procedure delay;

detect a data acknowledgement frame from the first client device; and transmit the second data frame to a second client device using the shared communication network, wherein the first data frame and the second data frame are transmitted sequentially, and wherein the second data frame is transmitted to the second client device from the system prior to waiting for a distributed coordination function inter frame space (DIFS) delay that transfers control of the shared communication network to a second system for transmitting data.

2. The system of claim 1, wherein the deadline comprises a time by which the first data frame or the second data frame is to be transmitted.

3. The system of claim 2, wherein the processor is to identify an order in which to transmit the first data frame and the second data frame based on the deadline.

4. The system of claim 1, wherein the first data frame or the second data frame is to be broadcast or multicast.

5. The system of claim 1, wherein the second data frame is a retransmission of the first data frame and the second data frame is transmitted to additional client devices.

6. The system of claim 5, wherein a control frame comprises data to synchronize nodes in a network.

7. The system of claim 1, wherein a short inter frame space corresponds to a time period in a media access control specification.

8. The system of claim 1, wherein the executable instructions that, based at least on execution by the processor, cause the processor to transmit the first data frame using a carrier sense multiple access with collision detection technique.

9. A method for transmitting data comprising:
detecting, via a system, a plurality of data frames to be transmitted using a shared communication network;
selecting, via the system, a first data frame and a second data frame from the plurality of data frames based on a deadline for each of the plurality of data frames;
transmitting, via the system on the shared communication network, the first data frame to a first client device;
waiting for a predetermined delay period, the predetermined delay period corresponding to a physical layer convergence procedure delay;
detecting, via the system, a data acknowledgement frame from the first client device;
transmitting, via the system on the shared communication network, the second data frame to a second client device, wherein the first data frame and the second data frame are transmitted sequentially, and wherein the second data frame is transmitted to the second client device from the system prior to waiting for a distributed coordination function inter frame space (DIFS) delay that transfers control of the shared communication network to a second system for transmitting data; and
transferring, via the system, control of the shared communication network to an external device by stopping transmission of data frames for a period of time equal to a distributed coordination function inter frame space delay.

10. The method of claim 9, wherein the deadline comprises a time by which the first data frame or the second data frame is to be transmitted.

11. The method of claim 10, comprising identifying an order in which to transmit the first data frame and the second data frame based on the deadline.

12. The method of claim 9 wherein the first data frame or the second data frame is to be broadcast or multicast.

13. The method of claim 9, wherein the second data frame is a retransmission of the first data frame and the second data frame is transmitted to additional client devices.

14. The method of claim 13, wherein a control frame comprises data to synchronize nodes in a network.

15. The method of claim 9, wherein the predetermined delay period corresponds to a time period in a media access control specification.

16. One or more computer-readable storage devices for transmitting data comprising a plurality of instructions that, based at least on execution by a processor, cause the processor to:
detect, via a system, a plurality of data frames to be transmitted using a shared communication network;
select, via the system, a first data frame and a second data frame from the plurality of data frames based on a deadline for each of the plurality of data frames;
transmit, via the system on a shared communication network, the first data frame to a first client device;
wait for a predetermined delay period, the predetermined delay period corresponding to a physical layer convergence procedure delay;
detect, via the system, a data acknowledgement frame from the first client device;
transmit, via the system on the shared communication network, the second data frame to a second client device, wherein the first data frame and the second data frame are transmitted sequentially by a communication interface, and wherein the second data frame is transmitted to the second client device from the system prior to waiting for a distributed coordination function inter frame space (DIFS) delay that transfers control of the shared communication network to a second system for transmitting data; and
transfer, via the system, control of the shared communication network to an external device by stopping transmission of data frames for a period of time equal to a distributed coordination function inter frame space delay.

17. The one or more computer-readable storage devices of claim 16, wherein the deadline comprises a time by which the first data frame or the second data frame is to be transmitted.

18. The one or more computer-readable storage devices of claim 17, wherein the plurality of instructions cause the processor to identify an order in which to transmit the first data frame and the second data frame based on the deadline.

19. The one or more computer-readable storage devices of claim 16, wherein the first data frame or the second data frame is to be broadcast or multicast.

20. The one or more computer-readable storage devices of claim 16, wherein the second data frame is a retransmission of the first data frame and the second data frame is transmitted to additional client devices.

21. The one or more computer-readable storage devices of claim 19, wherein the first data frame or the second data frame comprises data from an aggregate frame, the aggregate frame comprising individual frames for the first client device or the second client device and a block acknowledgment.

22. A system for transmitting data, comprising:
a processor; and
a computer-readable memory storage device storing executable instructions that, based at least on execution by the processor, cause the processor to:
receive a data transmission via a shared communication network; and acknowledge the receipt of the data transmission, within a predetermined delay period corresponding to a physical layer convergence procedure delay, by transmitting data frames to a plurality of devices based on a deadline for the plurality of data frames, wherein a first data frame and a second data frame are transmitted sequentially, and wherein the second data frame is transmitted to an external device from the system prior to waiting for a distributed coordination function inter frame space (DIFS) delay that transfers control of the shared communication network to a second system for transmitting data.

* * * * *